United States Patent [19]

Johnson, Sr.

[11] Patent Number: 4,534,297

[45] Date of Patent: Aug. 13, 1985

[54] WHEEL POSITION CONTROL FOR RAILWAY MAINTENANCE VEHICLE

[76] Inventor: Theodore C. Johnson, Sr., 14917 Hillbrook Cir., Novelty, Ohio 44072

[21] Appl. No.: 446,369

[22] Filed: Dec. 2, 1982

[51] Int. Cl.³ .................. B61D 15/00; B61F 13/00
[52] U.S. Cl. .................................. 105/215 C
[58] Field of Search ............... 105/26 R, 90 A, 215 C

[56] References Cited

U.S. PATENT DOCUMENTS

| | | | |
|---|---|---|---|
| 1,274,102 | 7/1918 | Srakula | 105/215 C |
| 1,827,898 | 10/1931 | Moore | 105/215 C |
| 2,157,651 | 5/1939 | Fildes | 105/215 C |
| 2,630,766 | 3/1953 | Wunsch | 105/215 C |
| 3,120,820 | 2/1964 | Bingham | 105/215 |
| 3,130,686 | 4/1964 | Fiechter et al. | 105/215 C |
| 3,134,343 | 5/1964 | Matsumura | 105/26 R X |
| 3,338,184 | 8/1967 | Fisher | 105/215 C |
| 3,730,105 | 5/1973 | Holley | 105/215 C |
| 3,762,337 | 10/1973 | McKeon et al. | 105/159 |
| 3,980,025 | 9/1976 | Olson, Sr. et al. | 105/215 C |

Primary Examiner—Randolph A. Reese

Attorney, Agent, or Firm—Body, Vickers & Daniels

[57] ABSTRACT

Railway maintenance vehicles are disclosed which are of the character having a frame assembly provided with drivable ground engaging tires and rail engaging flanged wheels. The frame assembly supports maintenance equipment, and the rail engaging wheels are displaceable between first and second positions relative to the frame assembly. In the first position the flanged wheels engage underlying rail members so as to support the vehicle with the ground engaging tires in suspension above ground, and in the second position the flanged wheels are elevated from the rails and the tires engage ground to support the vehicle. Heretofore, maintenance operations have been performed with the flanged wheels either in the first or second position thereof. An improvement according to the present invention provides for the flanged wheels to be displaceable to a third position engaging against the rails to provide guidance and a stabilizing force while the tires engage ground to provide the primary vehicle support and stability during maintenance operations.

14 Claims, 11 Drawing Figures

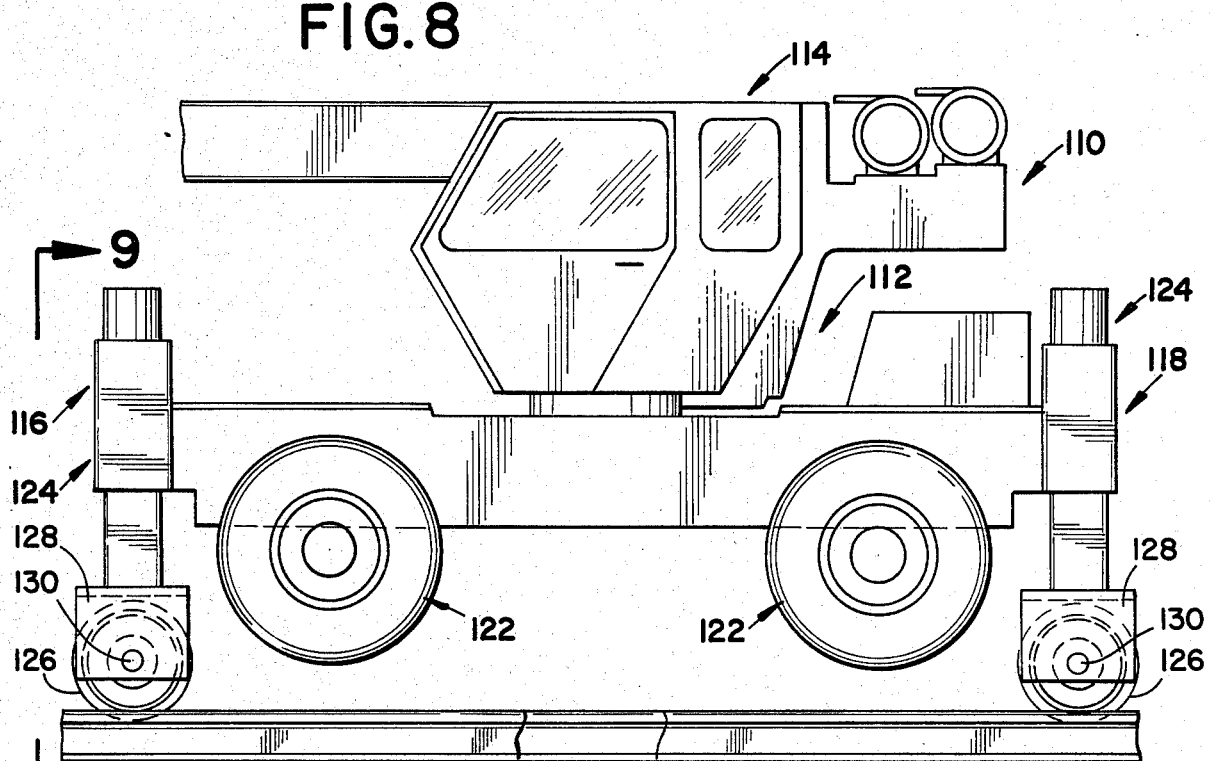
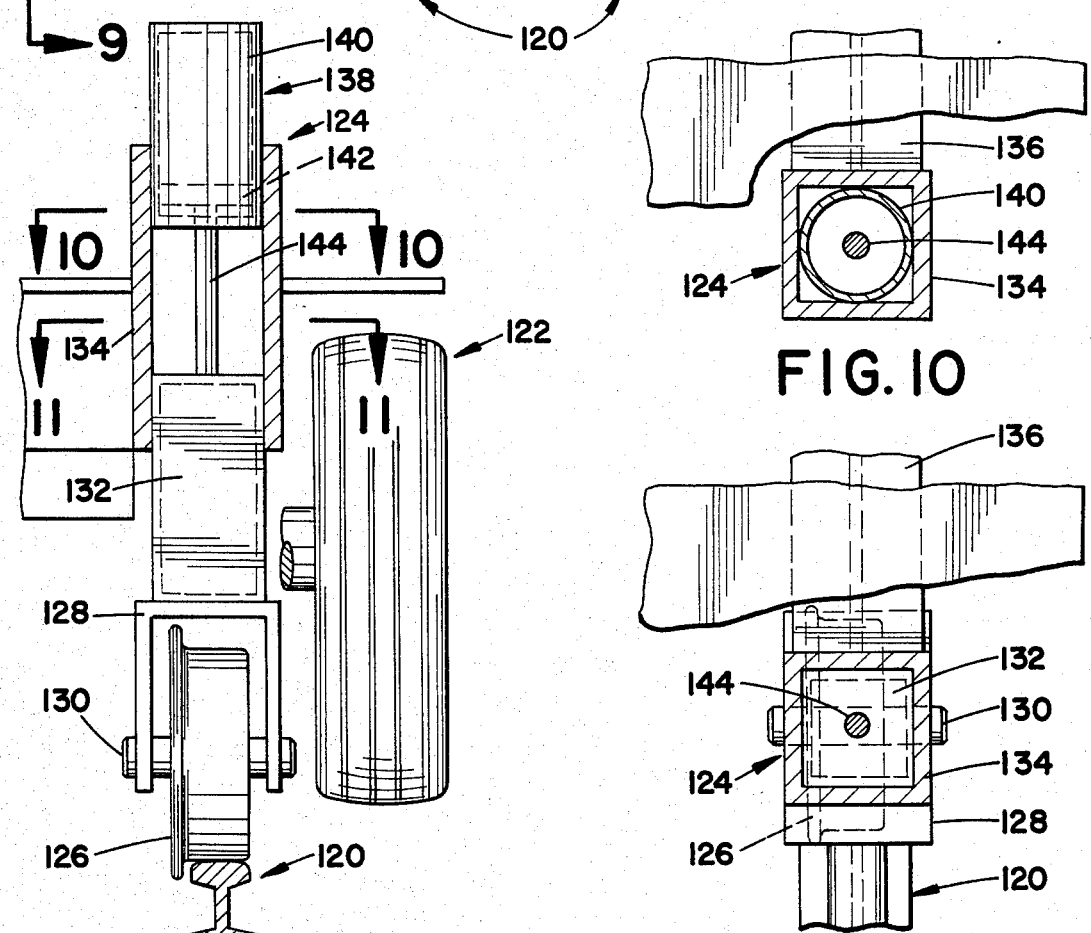
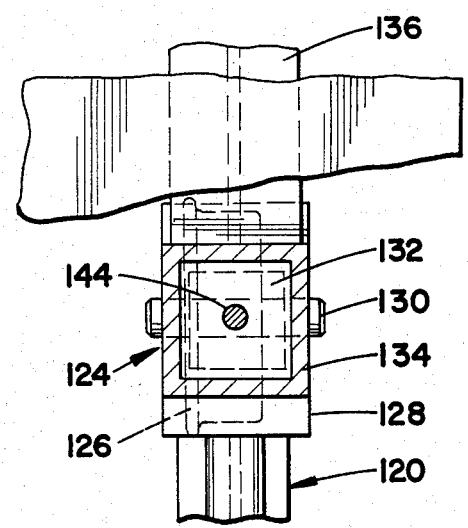

4,534,297

WHEEL POSITION CONTROL FOR RAILWAY MAINTENANCE VEHICLE

BACKGROUND OF THE INVENTION

The present invention relates to the art of railway maintenance vehicles and, more particularly, to an improvement in connection with such vehicles of the character having flanged rail engaging wheels and ground engaging tires enabling selective rail and ground support for the vehicle.

Railway maintenance vehicles having both rail and ground support capabilities with respect to maintenance equipment such as dump trucks, cranes, and the like, have been provided heretofore. Such vehicles generally include a frame assembly supporting drivable ground engaging pneumatic tires to enable displacement of the vehicle along a roadway or the like and into position relative to railway rails, and to provide ground support for the vehicle and maintenance equipment during use thereof at a given site along a railway. The ground engaging tires are also used to move the vehicle along the railway within an area in which maintenance is being performed. Such vehicles further include flanged rail engaging wheels supported on the frame assembly for displacement relative thereto between a first position in which the wheels are elevated from engagement with the underlying rails, when the frame assembly and maintenance equipment are ground supported by the tires, and a second position in which the railway wheels engage the rails and elevate the frame assembly and maintenance equipment so as to support the ground engaging tires in suspension above ground. In the latter position the wheels primarily function to facilitate transportation of the vehicle along a railway such as between different areas or locations at which maintenance is to be performed. However, depending on the type of maintenance equipment associated with the vehicle, maintenance work can be performed with the wheels in the second position. The flanged rail engaging wheels are provided in pairs at opposite ends of the frame assembly and, in certain maintenance vehicles, each pair of wheels is supported for displacement relative to the frame assembly whereas, in other vehicles, the wheels are supported for individual displacement relative to the frame assembly.

Railway maintenance equipment of the foregoing character has utility in connection with performing numerous railway maintenance and maintenance related operations such as, for example, rail laying, excavating laterally of railway tracks, and the elevating and lowering of loads such as railway ties, cars, rails and track laying or maintenance equipment and supplies. In connection with these and other maintenance operations, it will be appreciated that considerable lateral or side thrust forces and rocking motions are imposed on the maintenance equipment, such as by the lifting and dropping of heavy loads. Thus, many maintenance operations cannot be performed with the equipment supported on the rails by the flanged wheels in that the narrow wheel base thereof promotes tilting of the vehicle which can result in turning over of the vehicle. Further, in this respect, rocking movement can and does cause derailment of the vehicle when so supported.

While the foregoing potential problems are reduced to some extent by performing maintenance with the flanged wheels elevated and the equipment supported laterally outwardly of the rails by the ground engaging tires, such side thrust and rocking motions still often result in lateral displacement of the vehicle and thus the elevated rail engaging wheels so that the latter are out of alignment with the rails when it is desired to elevate the maintenance vehicle for transportation along the rails on the rail engaging wheels. Lateral misalignment between the railway wheels and underlying rails as the result of lateral displacement of the maintenance equipment relative to the railway is a frequent occurrence and requires a time consuming operation of the maintenance vehicle to regain the desired alignment. Accordingly, a considerable amount of useful time is generally lost in having to periodically realign the vehicle during maintenance operation thereof. Such lateral displacement and misalignment result in excessive wear and damage to the tires. When it is considered that the latter cost about one-thousand dollars each, it will be appreciated that the cost of vehicle maintenance is undesirably high. Still further, such misalignment, or an undesired lateral tilting of the vehicle, can also occur as the result of variations in the level of the ground or railway ties underlying the vehicle tires. More importantly, such side thrust and motion can alone, or together with tilting as a result of uneven elevation conditions along the railway, cause turning over of the maintenance vehicle. It will be appreciated of course that over-turning of the maintenance vehicle is both dangerous to the operator and workmen along the railway and, at a minimum, results in considerable damage to the equipment.

SUMMARY OF THE INVENTION

In accordance with the present invention, an improvement in railway maintenance vehicles of the foregoing character provides stability for the vehicle during maintenance operation thereof and during movement of the vehicle within a maintenance area, and guidance relative to the railway rails during such movement, thus to restrain lateral displacement of the vehicle relative to the rails and to minimize the likelihood of derailment or turning over of the maintenance vehicle. More particularly in this respect, the present invention provides a third operative position for the flanged rail engaging wheels in which the latter stabilize the vehicle when the vehicle is in a work position supported by the ground engaging tires. In the third position, the flanged wheels engage against the rails with a stabilizing force whereby the flanges of the wheels deter any tendency of the vehicle to shift laterally of the rails in response to lateral or side thrust force or motion imposed on the ground engaging tires during operation of the maintenance equipment. Likewise, during movement of the vehicle along the railway within a maintenance area through the use of the ground engaging tires, the flanged wheels provide stability and guidance for maintenaning the vehicle properly aligned with the rails, and restrain any tendency of lateral displacement of the vehicle relative to the rails during such movement.

Preferably, the flanged wheels are mounted on the vehicle frame in a manner which provides for the wheels in the third positions thereof to provide compensation for uneven ground and/or rail elevation conditions to further stabilize the vehicle against tilting or lateral displacement under such conditions. In preferred embodiments, this is achieved by mounting the pairs of wheels at the opposite ends of the vehicle frame for each wheel to be either pivotally supported on the frame for movement about a laterally extending horizontal axis, or supported for vertical reciprocating displacement relative to the frame. This advantageously enables the flanged wheels to remain in stabilizing engagement with the rails when the wheels are in the third position so as to provide the desired guidance and stability in response to uneven surface elevations as defined by the rails and/or the ground laterally outwardly of the rails and underlying the vehicle tires. Further in accordance with preferred embodiments, positioning of the wheels in the three selective positions thereof is achieved through the use of a hydraulic fluid flow system and the control of flow of hydraulic fluid to and from cylinder units associated with the wheels. Through the use of accumulator or flow control valves, the pressure in the piston and cylinder units can be maintained at a predetermined constant pressure when the wheels are in the third positions, thus for each wheel to continuously engage a rail with a constant force. Such continuous engagement between the flanged wheels and rails when the wheels are in the third positions, and engagement therewith at a constant stabilizing force, optimizes the guidance and stabilizing functions during movement of the vehicle within a maintenance area and during use of the maintenance equipment in the maintenance area. More particularly in this respect, the wide base for lateral support of the vehicle as defined by the ground engaging rubber tires is maintained and provides primary support for the vehicle during maintenance operations, and the lateral stability of the vehicle during such operations is increased as a result of the stability imparted by the flanged wheels engaging the rails with a constant force.

As with such maintenance vehicles heretofore provided, the first and second positions of the flanged rail engaging wheels facilitate lifting the maintenance vehicle relative to the rails such that the ground engaging tires are supported in suspension, thus to facilitate movement of the vehicle along the rails on the wheels such as from one maintenance area or location to another, and provide for the flanged wheels to be elevated out of engagement with the rails to facilitate movement of the vehicle by the ground engaging tires along a roadway or the like and into initial alignment with the rails at a work location.

It is accordingly an outstanding object of the present invention to provide an improved railway maintenance vehicle of the character having flanged wheels for rail support of the vehicle and tires for ground support of the vehicle during maintenance operation thereof and displacement of the vehicle in a maintenance area, and by which improvement the vehicle is stabilized by the flanged wheels during such ground support.

A further object is the provision of an improved railway maintenance vehicle of the foregoing character in which the flanged wheels are adapted to engage against railway rails while primary support for the vehicle is provided by the ground engaging tires, whereby the flanged wheels provide improved lateral stability for the vehicle against tipping during operation of maintenance equipment thereon.

Another object is the provision of an improved maintenance vehicle of the foregoing character in which the flanged wheels engage the rails during primary support of the vehicle by the ground engaging tires to provide guidance for displacement of the vehicle in a maintenance area and stability against lateral displacement of the maintenance vehicle during such movement.

Yet another object is the provision of an improved railway maintenance vehicle of the foregoing character in which the flanged wheels engage the rails during primary support of the vehicle by the tires with a predetermined stabilizing force which remains constant in response to uneven surface elevation conditions along the rails and/or the ground laterally outwardly adjacent thereto.

Still another object is the provision of a railway maintenance vehicle of the foregoing character with an improved hydraulic control system enabling selective positioning of the flanged wheels in a first position engaging the rails and elevating the vehicle for the ground engaging tires to be supported in suspension above ground, in a second position in which the flanged wheels are elevated from the rails for the total vehicle load to be supported by the ground engaging tires, and in a third position in which the vehicle load is primarily supported by the ground engaging tires and in which the flanged wheels are biased under hydraulic pressure against the rails to provide a predetermined constant stabilizing force during movement of the vehicle along the rails in a maintenance area and during use of the maintenance equipment on the vehicle.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which:

FIG. 8 is a side elevation view of another embodiment of a railway maintenance vehicle provided with the improvement according to the present invention;

FIG. 9 is an end elevation view of the vehicle, partially in section, taken along line 9—9 in FIG. 8;

FIG. 10 is a cross-sectional view taken along line 10—10 in FIG. 9; and,

FIG. 11 is a cross-sectional view taken along line 11—11 in FIG. 9.

DESCRIPTION OF PREFERRED EMBODIMENTS

Figure 1:
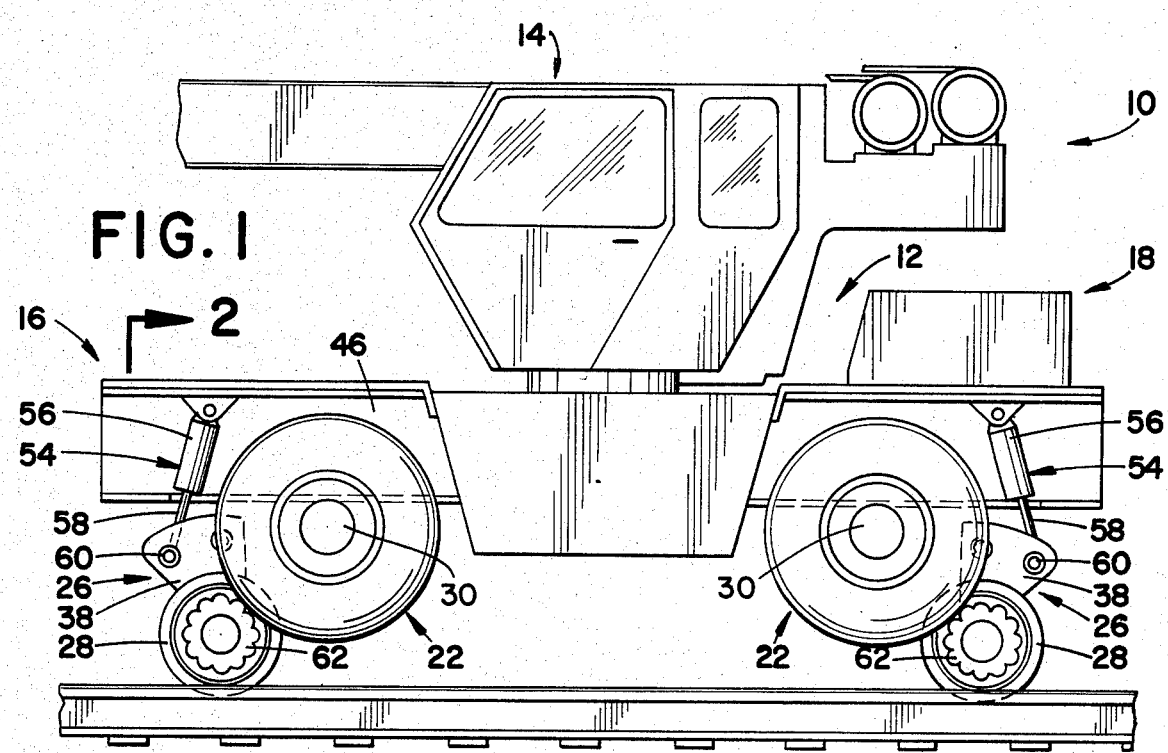
FIG. 1 is a side elevation view of one embodiment of a railway maintenance vehicle provided with the improvement according to the present invention and showing the flanged wheels in a first position engaging underlying rails and supporting the vehicle for the ground engaging tires to be elevated above ground.
Figure 2:
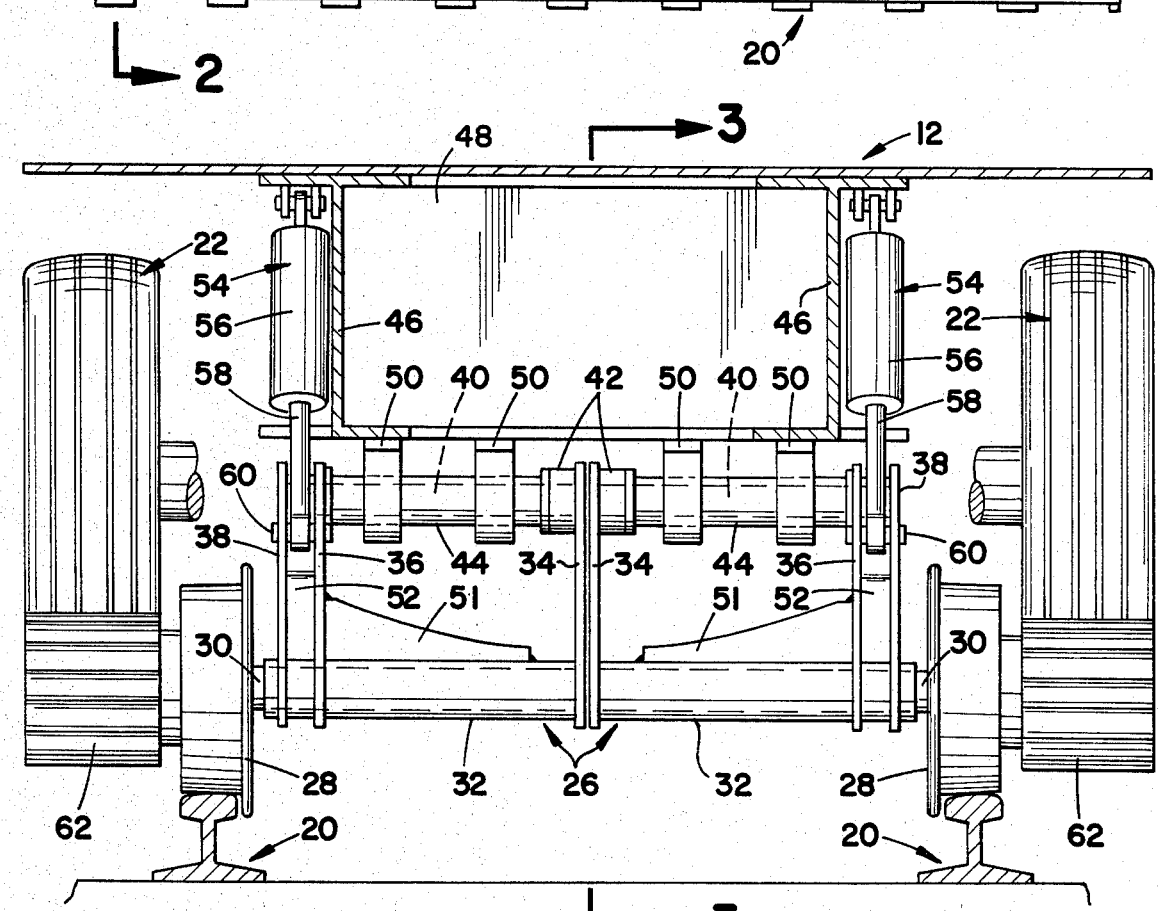
FIG. 2 is an end elevation view of the vehicle, partially in section, taken along line 2—2 in FIG. 1.
Figure 3:
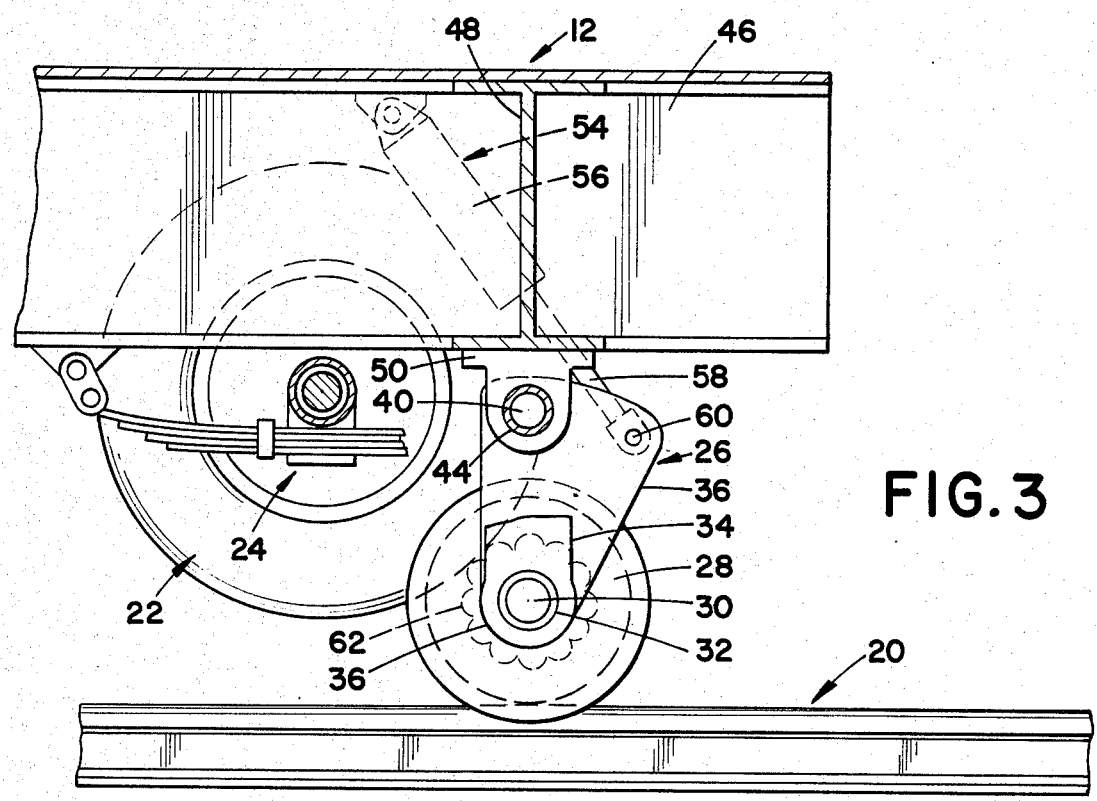
FIG. 3 is a cross-sectional elevation view taken along line 3—3 in FIG. 2.

With reference now in greater detail to the drawings wherein the showings are for the purpose of illustrating preferred embodiments of the invention only, and not for the purpose of limiting the invention, a railway maintenance vehicle 10 is illustrated in FIGS. 1-3 which is comprised of a frame assembly 12 supporting maintenance equipment which, for purposes of illustration only, is shown in the form of a crane 14. As is well known in the art, such a crane or other maintenance equipment is mounted on the frame assembly for pivotal movement about a vertical axis to enable performance of maintenance operations forwardly, rearwardly and laterally of the vehicle. Frame assembly 12 and thus vehicle 10 has opposite ends 16 and 18 with respect to the longitudinal direction of underlying railway rails 20 when the vehicle is oriented in a use position relative to the rails as illustrated in FIGS. 1-3. In the manner which will become apparent hereinafter, vehicle 10 is adapted to be ground supported by pairs of ground engaging pneumatic tires 22 adjacent the opposite ends of the frame. Tires 22, again as is well known in the art, are mounted on the frame by suitable suspension arrangements such as, for example, the spring suspension arrangement 24 partially shown in FIG. 3. Further, while not shown, either one or both pairs of tires 22 are adapted to be driven by the power unit portion of the maintenance vehicle to enable transportation of the maintenance vehicle along a roadway and positioning and movement of the vehicle along tracks 20.

Frame 12 further supports flanged rail engaging wheel units 26 each of which is longitudinally outwardly adjacent a corresponding one of the tires 22 at opposite ends of the vehicle. Wheel units 26 are identical in construction and, accordingly, it will be appreciated that the following description of the wheel units illustrated at end 16 of the vehicle and shown in detail in FIGS. 2 and 3 of the drawing is applicable to wheel units 26 at end 18 of the vehicle. With reference in particular to FIGS. 2 and 3, each wheel unit 26 includes a flanged rail engaging wheel 28 on the laterally outer end of a corresponding axle 30 rotatably supported in a corresponding laterally extending bearing sleeve 32. A support plate 34 is welded on the laterally inner end of each bearing sleeve 32 and extends upwardly therefrom, and a pair of laterally spaced apart upwardly extending lever plates 36 and 38 are welded on the outer end of each of the bearing sleeves. Support plate 34 and lever plates 36 and 38 of each wheel unit are interconnected by a corresponding pivot rod 40 having its inner end secured to a collar 42 welded to plate 34 and having its outer end extending through plate 36 and welded thereto and to plate 38. Each pivot rod 40 and thus the corresponding plates 34, 36 and 38, is pivotally supported by a tubular sleeve 44 extending between plate 36 and collar 42 and which sleeve is rigidly mounted on frame 12. For example in this respect, frame 12 includes longitudinally extending I-beams 46 and a cross beam 48 therebetween, and each sleeve 44 is secured to the lower flanges of beams 46 and 48 by a pair of mounting straps 50 secured to the sleeve and flanges such as by welding. Accordingly, it will be appreciated that each wheel unit 26 is supported for pivotal movement about a laterally extending horizontal axis defined by the axis of pivot rod 40. Preferably, each wheel unit as thus far described is rigidified by reinforcing plates 51 and 52 respectively welded between bearing sleeve 32 and lever plate 36 and between lever plates 36 and 38.

Pivotal displacement of each wheel unit 26 about the axis of pivot rod 40 is achieved by a corresponding double acting hydraulic piston and cylinder unit 54 at the laterally outer end of the wheel unit and each of which includes a cylinder member 56 housing a reciprocable piston, not shown, and a piston rod 58 connected to the piston and extending downwardly from the cylinder. The upper end of each cylinder 56 is pivotally fastened to the frame assembly, such as through the use of a mounting bracket welded to the underside of the upper flange of the corresponding longitudinally extending beam member 46 of the frame assembly, and the lower or outer end of each piston rod 58 extends between the corresponding pair of lever plates 36 and 38 and is pivotally attached thereto by a pin 60. While not shown in FIGS. 1-3, it will be appreciated that each of the cylinders 56 has its opposite ends connected to a source of hydraulic fluid under pressure enabling the flow of hydraulic fluid into and out of the cylinder on opposite sides of the piston therein to achieve reciprocation of the piston rod 58 relative thereto and thus pivotal movement of the wheel unit about the axis of pivot rod 40.

Figure 4:
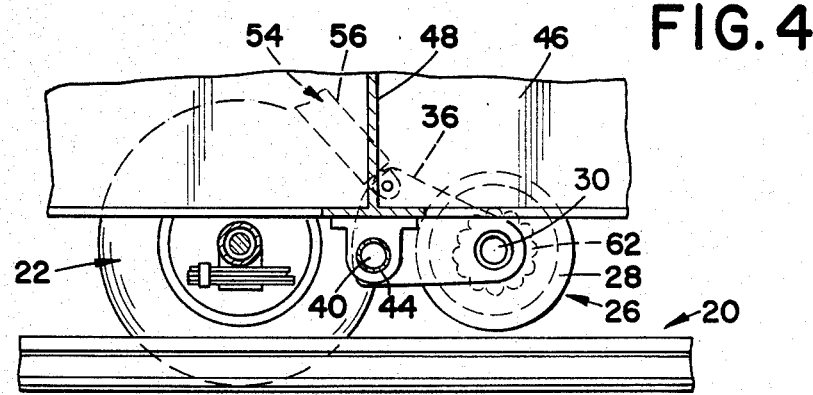
FIG. 4 is a cross-sectional view similar to FIG. 3 and illustrating the flanged wheel in a second position in which the wheel is elevated from the rails and the vehicle is fully supported by the ground engaging tire.

In the position of wheel units 26 shown in FIGS. 1-3, referred to herein as the first position, flanged wheels 28 engage rails 20 to elevate frame assembly 12 and maintenance equipment 14 thereon to the extent that ground engaging tires 22 are supported in suspension from the frame assembly and out of ground engagement. In the first position of wheel units 26, the maintenance vehicle is adapted to be displaced along rails 20, such as when it is desired to transport the vehicle from one maintenance location to another along the railway line. In the embodiment illustrated, wheels 28 of wheel units 26 are provided with hubs 62 having fluted outer surfaces and which hubs, in the first position of wheel units 26, frictionally engage the outer surface of the corresponding ground engaging tires 22, whereby displacement of vehicle 10 along rails 20 can be achieved by driving tires 22 through the power train portion of the vehicle. By controlling the flow of hydraulic fluid to piston and cylinder units 54 to achieve retraction of the corresponding piston rod 58, wheel units 26 are pivotal about the axis of the corresponding pivot rod 40 longitudinally outwardly of the corresponding end of the frame assembly, whereby the frame assembly and maintenance equipment are lowered to bring tires 22 into engagement with the ground laterally outwardly adjacent rails 20. Continued retraction of wheel units 26 displaces the latter to a second position thereof relative to frame assembly 12, as shown in FIG. 4, and in which position flanged wheels 28 are elevated out of engagement with rails 20 whereby the entire weight of the frame assembly and maintenance equipment is supported by ground engaging tires 22. In the latter or second position of wheel units 26, maintenance vehicle 10 is adapted to be driven along a roadway or the like and into appropriate orientation with railway rails when the vehicle is to be used in connection with maintenance operations. Heretofore, when maintenance was performed with the flanged wheel units in the second positions, the maintenance vehicle was subject to lateral displacements relative to rails 20, either as a result of lateral or side thrust forces and rocking motions causing tires 22 to slide laterally of the underlying support surface, and/or as the result of an uneven underlying ground surface such as might be defined by spaces between adjacent railway ties or different elevations of the ground on laterally opposite sides of the rails.

Figure 5:
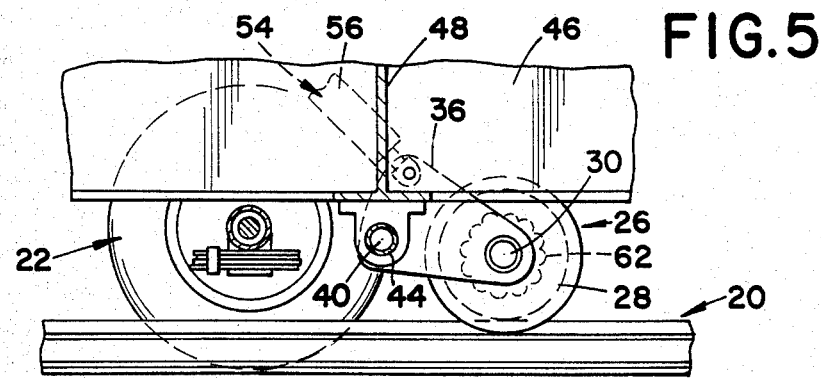
FIG. 5 is a cross-sectional view similar to FIG. 3 and showing the flanged wheel in a third position in which the vehicle is primarily supported by the ground engaging tire and the flanged wheel is biased against the rail.

In accordance with the present invention, the foregoing and other problems are minimized by providing a third position for wheel units 26 in which each of the flanged wheels 28 engage with the corresponding rail 20 when tires 22 provide ground support for the vehicle during use thereof, and which positions of wheel units 26 will be understood from FIG. 5 of the drawing. In this position of the wheel units, primary support for the frame assembly and maintenance equipment is still provided by tires 22, and flanged wheels 28 are biased downwardly against rails 20 with a predetermined stabilizing force to restrain wheels 28 from disengaging with rails 20 in response to lateral or side thrust forces and rocking motions imposed on the vehicle. In the preferred embodiments, as will become apparent hereinafter, displacement of the wheel units to the third position and the application of the desired stabilizing force thereof against rails 20 is achieved by appropriate control of the flow of hydraulic fluid relative to piston and cylinder units 54, whereby the stabilizing force is proportionate to a predetermined hydraulic pressure maintained in the piston and cylinder units when the wheel units are in the third positions.

Figure 6:
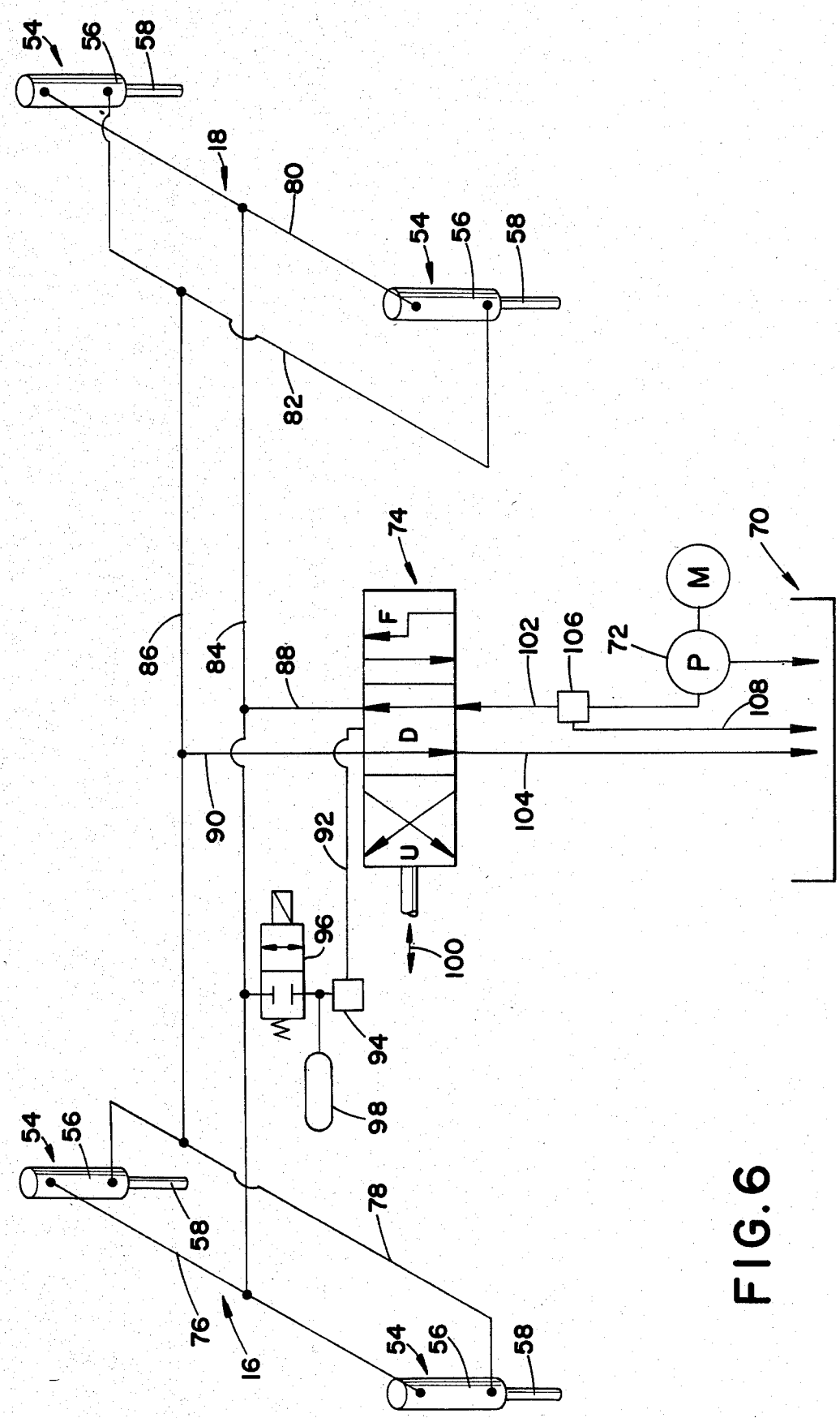
FIG. 6 is a schematic illustration of a hydraulic fluid control system for displacing the flanged wheels between the three positions thereof.

A hydraulic control system enabling displacement of wheel units 26 between the three positions described above, and the application of a predetermined stabilizing force when the wheel units are in the third position, is schematically illustrated in FIG. 6 of the drawing. In FIG. 6, the piston and cylinder units 54 are shown in the pairs corresponding to the opposite ends 16 and 18 of maintenance vehicle 10 described hereinabove and, accordingly, in relationship with the corresponding wheel unit 26 of the vehicle. The hydraulic control system in FIG. 6 includes a source of hydraulic fluid 70 and a motor driven pump 72 adapted to deliver hydraulic fluid under pressure from source 70 to hydraulic piston and cylinder units 54 under the control of a three-way flow control valve 74 as described more fully hereinafter. Piston and cylinder units 54 at end 16 of the vehicle are interconnected by a common upper flow line 76 and a common lower flow line 78 respectively communicating with the cylinders 56 above and below the pistons therein. Similarly, piston and cylinder units 54 at end 18 of the vehicle are interconnected by a common upper flow line 80 and a common lower flow line 82. The upper flow lines 76 and 80 at opposite ends of the vehicle are interconnected by a common line 84, and the lower flow lines 78 and 82 are interconnected by a common flow line 86. Flow line 84 is adapted to be in flow communication with source 70 through valve 74 by means of a flow line 88 which is in a fixed position relative to valve 74, and flow line 86 is adapted to be in communication with source 70 by a flow line 90 which is likewise fixed relative to valve 74. As will become apparent hereinafter, flow line 84 is also adapted to be placed in communication with source 70 through valve 74 by a flow line 92 which extends from the valve to line 84 through a pressure reducing valve 94 and a normally closed solenoid actuated valve 96. For the purpose set forth hereinafter, a fluid pressure accumulator 98 is provided between valves 94 and 96.

Three-way valve 74 can be manually, electrically or otherwise actuated and is adapted to reciprocate in opposite directions as indicated by arrow 100 to position the valve relative to flow lines 88, 90 and 92. Valve 74 has three positions in this respect corresponding to the first, second and third positions of the wheel units described hereinabove and which three positions are respectively designated by the letters D, U and F in FIG. 6. In each of the three valve positions, fluid flow passageways therethrough provide for fluid flow in the direction of the arrows shown. Displacement of valve 74 is also relative to a fixed inlet line 102 through which fluid is delivered from source 70 by pump 72 and a fixed return flow line 104 leading back to source 70. Fluid from source 70 is delivered to line 102 by pump 72 through a pressure responsive overflow valve 106 which, as is well known, closes in response to a predetermined pressure in line 102 and provides for the pumped fluid above such pressure to be returned to source 70 through a return line 108.

When valve 74 is in the position shown in FIG. 6, corresponding to the first position of wheel units 26, solenoid valve 96 is closed, and fluid flow from source 70 is through lines 102, 88, 84, 76 and 80 to the upper ends of cylinders 56. At the same time, the lower ends of the cylinders are open for return flow to source 70 through lines 78, 82, 86, 90 and 104. Accordingly, hydraulic fluid under pressure is pumped into the upper ends of cylinders 56 to displace piston rods 58 downwardly so as to pivot wheel units 26 of the vehicle to the first position shown in FIGS. 1-3 of the drawing. In connection with such displacement, it will be appreciated that a high fluid pressure is required to achieve elevation of the maintenance vehicle through the wheel units and maintenance of the latter in the first positions thereof, whereby it will be understood that pump 72 is operable to deliver fluid to the piston and cylinder units at the necessary pressure level for this purpose and that valve 106 closes to maintain the necessary pressure and to communicate the flow from pump 72 back to source 70 when the necessary pressure is exceeded. To displace the wheel units from the first position to the second position shown in FIG. 4 of the drawing, valve 74 is shifted to the right in FIG. 6. In the latter position, solenoid valve 96 remains closed and fluid from source 70 is pumped through line 102 and across valve 74 to line 90 and thence to lines 86, 78 and 82 and into the lower ends of cylinders 56. At the same time, flow lines 76, 80 and 84 connecting the upper ends of the cylinders are open for return flow to source 70 through line 88 and across the valve to return line 104. Accordingly, piston rods 58 are elevated to displace the wheel units out of engagement with the rails so as to lower the vehicle for tires 22 to engage ground and for the wheel units to ultimately be spaced above the rails. The wheel units can be locked in the second positions, such as through the use of suitable latch arrangements, not shown, thus to avoid having to operate the hydraulic system to maintain the wheel units in the second positions such as when the maintenance vehicle is being transported along a roadway or the like. It will be appreciated that when valve 74 is in the respective positions providing for displacement of the wheel units to the first and second positions thereof, flow through valve 74 to the upper ends of the piston and cylinder units through line 92 is blocked, and that the normally closed solenoid valve 96 prevents backflow of fluid from the upper ends of the piston and cylinder units to pressure reducing valve 94 and accumulator 98 during displacement of the wheel units between the first and second positions thereof.

With the wheel units in the second positions thereof, the entire weight of the vehicle is imposed on tires 22 as mentioned hereinabove. To displace the wheel units to the third position to achieve the desired stability for the vehicle during the performance of maintenance operations, valve 74 is shifted to the left in FIG. 6 and, concurrently therewith, solenoid valve 96 is actuated to its open mode so as to provide for flow communication between pressure reducing valve 94 and line 84. Accordingly, fluid then flows from source 70 through pump 72 and line 102 through valve 74 to flow line 92 and valves 94 and 96 into lines 84, 76 and 80 and into the upper ends of the cylinders 56. At the same time, the lower ends of the piston and cylinder units are open to source 70 for return fluid flow thereto through lines 78, 82, 86 and 90 and across valve 74 to line 104. Thus, piston rods 58 are displaced downwardly to pivot wheel units 26 toward rails 20 and, in connection with achieving the desired stabilizing force between the wheel units and rails, pressure reducing valve 94 provides for flow of fluid to cylinders 56 at a predetermined pressure for this purpose. As is well known, such a pressure reducing valve is responsive to a pressure above the predetermined pressure to close fluid flow from source 70 through valve 96. When the wheel units are in the third positions, accumulator 98 functions to maintain each wheel unit in engagement with the underlying rail at a constant force by accommodating fluid pressure fluctuations between the piston and cylinder units 54. For example, a variation in elevation of one rail relative to the other, and which variation will be followed by the corresponding wheel unit, will cause a displacement of the piston in cylinder 56 of the wheel unit. Such piston displacement will be accommodated by flow to or from accumulator 98 so as to maintain the desired pressure against the piston and thus the desired force of the wheel unit against the rail.

The desired magnitude of the stabilizing force of the wheels of units 26 against rails 20 will vary in accordance with a number of factors including the weight of the maintenance vehicle, elevation conditions with respect to the rails and the ground laterally outwardly thereof, and the type of maintenance work being performed and thus an anticipated degree of side thrust and motion. For example, in connection with performing maintenance through the use of a laterally extending crane on a twentytwo ton maintenance vehicle, and movement of the vehicle within the maintenance area, a force of from one-thousand to one-thousand two-hundred pounds against the rails by each of the flanged wheel units has been found to provide adequate stability against lateral displacement and derailment, and guidance for following of the rails by the vehicle during movement of the vehicle in the maintenance area. Accordingly, in connection with this example, it will be appreciated that pressure reducing valve 94 would provide for delivering hydraulic fluid to piston and cylinder units 54 at the necessary pressure for applying the stabilizing force and, in conjunction with accumulator 98, for maintaining fluid in the piston and cylinder units at the necessary pressure.

In connection with the embodiment of the maintenance vehicle illustrated in FIGS. 1-3, articulation of the flanged wheel units for pivotal movement about the laterally extending horizontal axis defined by pivot pin 40 advantageously enables the flanged wheel of each unit to constantly engage the corresponding rail with the desired stabilizing force in the event that there are variations either in track level or the level of the ground laterally outwardly thereof, or tilting of the frame assembly relative to the ground support tires as a result of loads imposed during use of the maintenance equipment. While the foregoing one-thousand to one-thousand two-hundred pounds of stabilizing force is given as an example, it will be appreciated as mentioned hereinabove that the desired stabilizing force can vary in accordance with a number of conditions. Accordingly, it will be appreciated that pressure reducing valve 94 can be adjustable to facilitate varying the hydraulic pressure and thus the stabilizing force of the wheel units against the rails when the wheel units are in the third positions thereof. In any event, it is to be understood that in the third positions of the flanged wheel units the weight of the frame assembly and maintenance equipment is primarily supported by the ground engaging tires and not by the flanged wheels of the wheel units.

Figure 7:
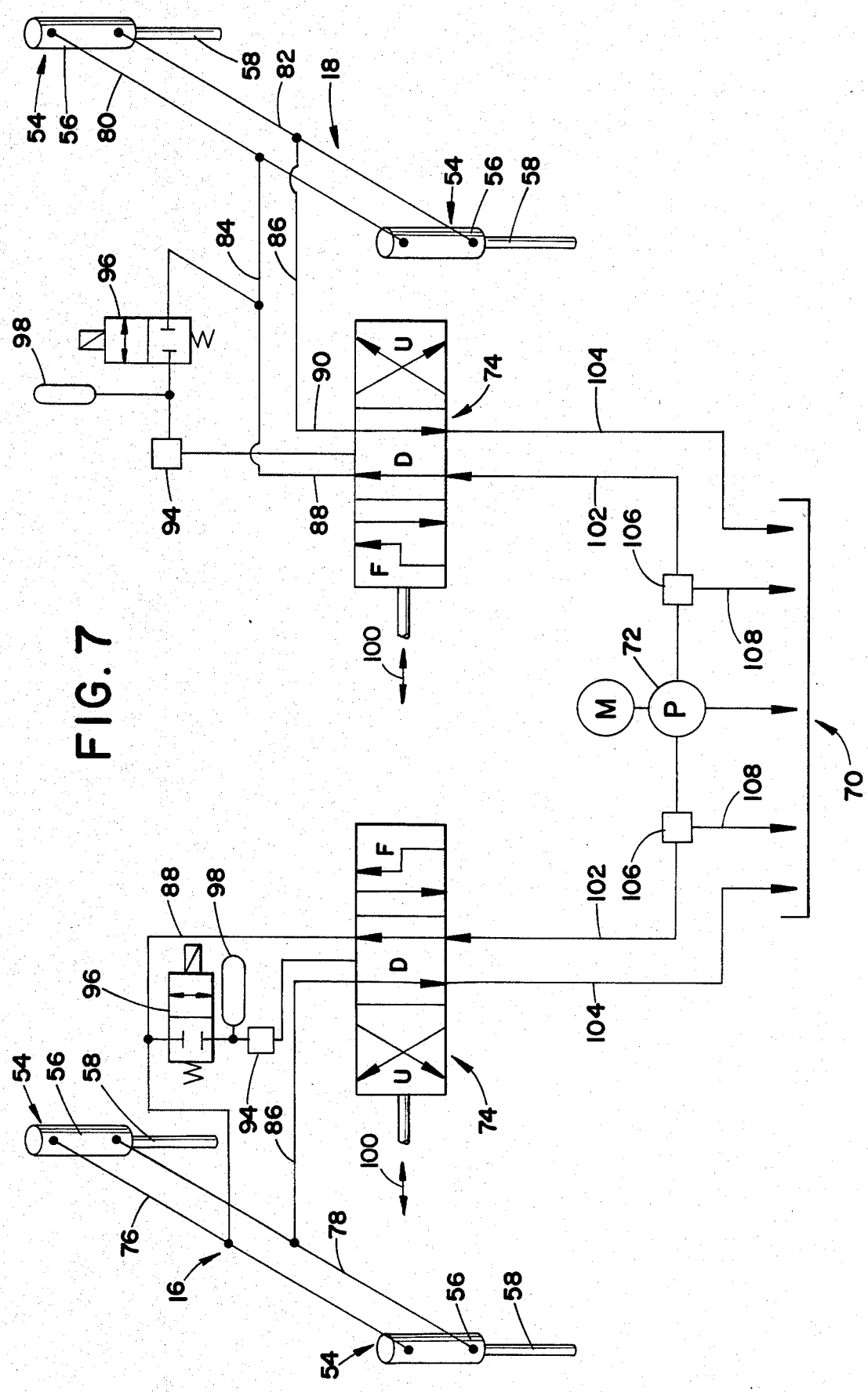
FIG. 7 is a schematic illustration of a modified hydraulic fluid control system for displacing the flanged wheels between the three positions thereof.

FIG. 7 schematically illustrates a hydraulic fluid flow control system similar to that shown in FIG. 6 except for the fact that in FIG. 7 the pairs of hydraulic piston and cylinder units 54 at each of the opposite ends of the vehicle are connected in flow communication with source 70 through a corresponding flow control valve 74. Fluid flow to and from the piston and cylinder units at each of the opposite ends and control of such flow for positioning the flanged wheel assemblies is identical to that described hereinabove in connection with FIG. 6, whereby identical numbers are shown in connection with corresponding component parts of the independent flow control systems shown in FIG. 7. Accordingly, it will be appreciated from FIG. 7 that the pairs of wheel units at the opposite ends of the vehicle are adapted to be independently displaced between the first, second and third positions thereof through appropriate positioning of the corresponding three-way flow control valve 74. This independent flow control arrangement advantageously enables the pressure reducing valve 94 associated with each pair of wheel units to be adjusted to provide a desired stabilizing force of the corresponding flanged wheels against the rails, whereby the same or different stabilizing forces can be imposed on the rails by the wheel units at opposite ends of the maintenance vehicle. Thus, should the weight distribution of the vehicle be unequal with respect to the load imposed on the ground engaging tires 22, either as a result of the construction of the vehicle or the load imposed thereon by the character of the maintenance work, different stabilizing forces can be applied to the rails at the opposite ends of the vehicle to achieve stabilizing forces proportionate to such unequal loading.

It is believed to be obvious from FIGS. 6 and 7 and thus not shown in a separate Figure, that each of the rail engaging wheel units 26 is adapted to be independently controlled with respect to the displacement between the three positions thereof. In this respect, each of the four hydraulic piston and cylinder units 54 would be connected to a source of hydraulic fluid through a corresponding three-way fluid flow control valve and corresponding flow lines and control devices, thus to provide flow to and from each piston and cylinder unit independently of the others. Such independent fluid flow control advantageously enables providing a desired stabilizing force of engagement of each wheel with the underlying rail independent of the others by adjustment of the corresponding pressure reducing valve 94. Such independent control is of further advantage in that it enables one of the rail engaging wheels to be elevated to the second position thereof while the other rail engaging wheels remain in the third position providing for stabilization of the maintenance vehicle.

FIGS. 8-11 illustrate another embodiment of a railway maintenance vehicle to which the improvement of the present invention is applicable. With reference to the latter Figures, maintenance vehicle 110 includes a frame assembly 112 supporting maintenance equipment 114 and having opposite ends 116 and 118 with respect to the direction of underlying railway rails 120. While only one side of the vehicle is shown in FIGS. 8-11, it will be appreciated that the vehicle includes pairs of ground engaging tires 122 adjacent each of the opposite ends of the frame assembly and which are structurally associated with the frame assembly in the manner and for the purpose of the ground engaging tires described hereinabove in connection with FIGS. 1-5. In the present embodiment, pairs of flanged rail engaging wheel units 124 are mounted at each of the opposite ends of the frame. Units 124 are of identical construction and, while only two units at the opposite ends can be seen in FIGS. 8-11, it will be appreciated that each end of the frame assembly has a second unit mounted thereon and that each pair of units is mounted on the corresponding end of frame assembly 112 in vertical alignment with the corresponding underlying rail 120. Each rail unit is comprised of a flanged rail engaging wheel 126 supported for rotation within a wheel housing 128 by means of a corresponding axle 130. Housing 128 is welded or otherwise secured to the lower end of a vertically extending support leg 132 which is slidably received in a vertically extending guide sleeve 134 mounted on the corresponding end of the frame assembly such as by welding to a beam member 136 of the frame assembly. Guide sleeve 134 is generally square in cross-section and support leg 132 is of corresponding cross-sectional contour, whereby the guide sleeve and leg interengage to maintain flanged wheel 126 against displacement about a vertical axis through the wheel assembly.

A double acting hydraulic piston and cylinder unit 138 is provided at the upper end of guide sleeve 134 and includes a cylinder member 140 secured within the guide sleeve such as by welding. Cylinder 140 houses a reciprocable piston 142 attached to the upper end of a piston rod 144 which has its lower end welded or otherwise attached to the upper end of support leg 132. While not shown, it will be appreciated that cylinder 140 has fluid flow lines opening thereinto on opposite sides of piston 142 enabling vertical displacement of the piston and thus vertical displacement of support leg 132 and rail engaging wheel 126 relative to frame assembly 112. It will be further appreciated that the flow of hydraulic fluid under sufficient pressure into the upper end of cylinder 140 of each of the wheel units displaces the corresponding support arm and wheel 126 downwardly into interengagement with the underlying rail 120 to achieve elevation of the maintenance vehicle to the first position shown in FIG. 8 in which the ground engaging tires 122 are supported in suspension from the frame assembly and above ground. In the first position of the rail engaging wheel units, the maintenance vehicle is supported by the wheels for displacement of the unit along the rails from one maintenance location to another and, in this instance, such movement would be achieved by pushing or pulling the maintenance vehicle through the use of a separate vehicle or, while not shown, by providing for the rail engaging wheels to be drivable through the power unit of the maintenance vehicle.

By introducing fluid under pressure into the lower ends of the cylinders and releasing fluid under pressure from the upper ends thereof pistons 142 and thus support legs 132 are displaced upwardly relative to the frame assembly, whereby the vehicle is lowered for tires 122 to engage ground laterally outwardly of rails 120 after which the rail engaging wheels are elevated from rails 120 to the second positions of the wheels in which the latter are spaced above the rails. While the dispositions of the flanged wheels in the second positions are not shown in the drawing, such disposition relative to the rails 120 will be appreciated from FIG. 4 illustrating the corresponding second positions in connection with the embodiment shown therein. In the second position of the rail engaging wheels of the embodiment in FIGS. 8-11, the vehicle is adapted to be driven along a roadway or the like and into a preliminary position of orientation relative to underlying rails at a maintenance location. In accordance with the present invention, hydraulic fluid under a predetermined low pressure is adapted to be introduced into the upper ends of cylinders 140 for each of the rail engaging wheels to be displaced downwardly to engage the rails with a stabilizing force during use of the vehicle to accomplish maintenance functions along the railway and while, for the latter purpose, the weight of the vehicle is primarily supported by the ground engaging tires as described hereinabove in connection with the embodiment of FIGS. 1-5. It will be appreciated that hydraulic piston and cylinder units 138 are adapted to be connected in hydraulic fluid flow control systems such as those shown in FIGS. 6 and 7, or each in a corresponding control system as described hereinabove, to enable displacement of the wheel units between the three positions thereof.

While considerable emphasis has been placed herein on the structures of the maintenance vehicles illustrated and described, it will be appreciated that the principles of the present invention are applicable to other maintenance vehicles providing ground engaging tires and rail engaging wheels operable in the manner described hereinabove to achieve movement of the vehicle along the rails when the vehicle is supported on the wheels and ground support of the vehicle by the tires during road transportation. Further, while the wheel units in the embodiment of FIGS. 1-5 are shown as being individually pivotal relative to the vehicle frame, the wheels of the pairs at each end the vehicle can be mounted on a common axle and pivotal together about a laterally extending pivot axis, or about both laterally and longitudinally extending pivot axes. Still further, while hydraulic circuitry has been illustrated and described in connection with achieving the desired displacements for the rail engaging wheels and the application of a stabilizing force against the rails by the wheels during maintenance operation of the vehicle, it will be understood that other hydraulic circuitry arrangements for achieving these purposes can readily be devised and that, in the circuitry shown herein or such other circuitry, each of the three positions of the wheel units could be controlled by an individual valve as opposed to a unitary three-way flow control valve. Moreover, while hydraulic piston and cylinder units are employed to achieve the displacements of the wheel units, it will be appreciated that other support and drive arrangements can be devised. For example, the wheel units could be displaced through hydraulic motor driven mechanical mechanisms. Accordingly, it is to be distinctly understood that the foregoing descriptive matter is to be interpreted merely as illustrative of the present invention and not as a limitation.

Having thus described the invention, it is claimed:

1. In a railway maintenance vehicle of the character adapted to be moved along a pair of underlying railway rails and including vehicle frame means, drivable tire means mounted on said frame means for moving said vehicle relative to ground, flanged rail engaging wheel means laterally between said tire means and supported on said frame means for displacement between first and second positions relative to said frame means, said wheel means in said first position engaging said pair of rails and supporting said vehicle for said tire means to be spaced above ground and supported in suspension from said frame means, whereby the entire weight of said vehicle is supported on said rails by said wheel means, said wheel means in said second position being elevated from said pair of rails for said tire means to engage ground laterally outwardly of each rail of said pair, whereby the entire weight of said vehicle is supported by said tire means, and means to displace said wheel means between said first and second positions, the improvement comprising: means to displace said wheel means to a third position in which said vehicle is supported for maintenance operation, said third position being between said first and second positions and providing for said tire means to engage ground laterally outwardly of each rail of said pair of rails to provide primary lateral support for said maintenance vehicle laterally outwardly of each of said rails and in which third position said wheel means engage said pair of rails to provide a stabilizing force for said maintenance vehicle laterally inwardly of said tire means.

2. The improvement according to claim 1, wherein said means to displace said wheel means to said third position includes means to maintain said wheel means in engagement with said rails at a predetermined stabilizing force.

3. The improvement according to claim 1, wherein said wheel means are in pairs at opposite ends of said frame means with respect to the direction of said rails, and said means to displace said wheel means to said third position includes means to selectively displace each said pair of wheel means to said third position.

4. The improvement according to claim 3, wherein said means to displace said wheel means to said third position includes means to maintain each said pair of wheel means in engagement with said rails at a predetermined stabilizing force.

5. The improvement according to claim 1, wherein said wheel means include pairs of wheels at each of the opposite ends of said frame means with respect to the direction of said rails, and said means to displace said wheel means to said third position includes means to selectively displace each wheel of each said pair of wheels to said third position.

6. The improvement according to claim 5, wherein said means to displace said wheel means to said third position includes means to maintain each of said wheels in engagement with said rails at a predetermined stabilizing force.

7. The improvement according to claim 1, wherein said means to displace said wheel means between said first and second positions and said means to displace said wheel means to said third position includes hydraulically actuated drive means for said wheel means and hydraulic circuit means including means for controlling fluid flow relative to said drive means for selectively displacing said wheel means between said first, second and third positions.

8. The improvement according to claim 7, wherein said hydraulic circuit means includes means to maintain fluid flow relative to said drive means at a predetermined pressure corresponding to said stabilizing force when said wheel means are in said third position.

9. The improvement according to claim 1, wherein said wheel means includes pairs of wheels at each of the opposite ends of said frame means, the wheels of a pair at at least one of said opposite ends each being supported on said frame means for independent pivotal displacement about a corresponding laterally extending axis and between said first, second and third positions.

10. The improvement according to claim 9, wherein said means to displace said wheel means between said first and second positions and said means to displace said wheel means to said third position includes hydraulically actuated drive means for said wheel means and hydraulic circuit means including means for controlling fluid flow relative to said drive means for selectively displacing said wheel means between said first, second and third positions.

11. The improvement according to claim 10, wherein said hydraulic circuit means includes means to maintain fluid flow relative to said drive means at a predetermined pressure corresponding to said stabilizing force when said wheel means are in said third position.

12. The improvement according to claim 1, wherein said wheel means includes pairs of wheels at each of the opposite ends of said frame means, the wheels of each said pair being supported on said frame means for independent vertical reciprocation relative thereto and between said first, second and third positions.

13. The improvement according to claim 12, wherein said means to displace said wheel means between said first and second positions and said means to displace said wheel means to said third position includes hydraulically actuated drive means for said wheel means and hydraulic circuit means including means for controlling fluid flow relative to said drive means for selectively displacing said wheel means between said first, second and third positions.

14. The improvement according to claim 13, wherein said hydraulic circuit means includes means to maintain fluid flow relative to said drive means at a predetermined pressure corresponding to said stabilizing force when said wheel means are in said third position.

* * * * *